United States Patent
Prasad et al.

(10) Patent No.: US 12,552,453 B2
(45) Date of Patent: Feb. 17, 2026

(54) METHOD FOR OPERATING A STEERING DEVICE, STEERING DEVICE, MOTOR VEHICLE

(71) Applicant: Robert Bosch GmbH, Stuttgart (DE)

(72) Inventors: Kunchala Siva Prasad, Tamilnadu (IN); Nicolas Huebner, Frankfurt am Main (DE); Sriram Venkatesh Krishnan, Tamilnadu (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/893,122

(22) Filed: Sep. 23, 2024

(65) Prior Publication Data

US 2025/0153769 A1    May 15, 2025

(30) Foreign Application Priority Data

Nov. 14, 2023    (DE) .................... 10 2023 211 295.7

(51) Int. Cl.
*B62D 6/00*    (2006.01)
*B62D 5/04*    (2006.01)

(52) U.S. Cl.
CPC ........... *B62D 6/008* (2013.01); *B62D 5/0466* (2013.01)

(58) Field of Classification Search
CPC ...... B62D 6/008; B62D 5/0466; B62D 5/006; B62D 5/04; B62D 15/0235
See application file for complete search history.

(56) References Cited

U.S. PATENT DOCUMENTS

| | | | | |
|---|---|---|---|---|
| 7,295,905 B2 * | 11/2007 | Yao | ........................ | B62D 6/008 701/1 |
| 2006/0086560 A1 * | 4/2006 | Furusho | ............... | B62D 5/0463 180/446 |
| 2012/0009197 A1 | 1/2012 | Sandvold et al. | | |
| 2021/0009197 A1 * | 1/2021 | Kim | ....................... | B60W 10/20 |
| 2023/0234640 A1 * | 7/2023 | Strecker | ................. | B62D 6/008 |

FOREIGN PATENT DOCUMENTS

| | | |
|---|---|---|
| DE | 10 2017 218 830 A1 | 4/2019 |
| DE | 10 2020 206 435 A1 | 11/2021 |

* cited by examiner

*Primary Examiner* — Phutthiwat Wongwian
*Assistant Examiner* — Sherman D Manley
(74) *Attorney, Agent, or Firm* — Maginot, Moore & Beck LLP

(57) ABSTRACT

A method for operating a steering device of a motor vehicle according to the steer-by-wire principle, wherein the steering device comprises a rotatable steering handle, in particular steering wheel, to provide a steering request, wherein the steering device comprises an electric machine mechanically coupled to the steering handle, wherein the electric machine is actuated in an active state of the steering device to generate a reset torque counteracting a rotational movement of the steering handle, and wherein the machine is control free in an idle state of the steering device. It is provided that, in the idle state, an electrical voltage of the electric machine is sensed to detect a rotation of the steering handle, and that, if the electrical voltage at least reaches a predetermined threshold value, and in particular exceeds it, the active state is activated.

9 Claims, 1 Drawing Sheet

METHOD FOR OPERATING A STEERING DEVICE, STEERING DEVICE, MOTOR VEHICLE

This application claims priority under 35 U.S.C. § 119 to application no. DE 10 2023 211 295.7, filed on Nov. 11, 2023 in Germany, the disclosure of which is incorporated herein by reference in its entirety.

The disclosure relates to a method for operating a steering device of a motor vehicle according to the steer-by-wire principle, wherein the steering device comprises a rotatable steering handle, in particular a steering wheel, to specify a steering request, wherein the steering device comprises an electric machine mechanically coupled to the steering handle, wherein when the steering device is in an active state, the electric machine is controlled to generate a reset torque counteracting the rotational movement of the steering handle, and wherein the machine is control free when the steering device is in an idle state.

In addition, the disclosure relates to a steering device and to a motor vehicle having such a steering device.

BACKGROUND

Steering devices according to the steer-by-wire principle are known. The steering handle, usually a steering wheel, is not mechanically connected to a steering actuator associated with at least one wheel of the motor vehicle, but is merely coupled to an electric machine to simulate a torque counteracting the rotational movement. In order to save energy, the machine is placed in a control free idle state when the vehicle is switched off or has been parked, for instance.

For example, a method for operating such a steer-by-wire steering system is known from the publication of patent application DE 10 2020 206 435 A1, in which a reset torque at the steering handle in a passive operating mode different from a normal driving mode is simulated depending on an activation condition by means of a simulation function, for example to assist a driver in getting out of the vehicle. The activation condition particularly includes an ignition signal and/or a closed state of a vehicle door.

A method for operating such a steer-by-wire steering system is known from the publication of patent application US 2021/0 009 197 A1, in which, in order to assist a driver in exiting, a steering shaft connected to a steering wheel is twisted to a mechanical stop in response to predetermined signals, such that further twisting in the corresponding direction is not possible and the driver may hold onto the steering wheel when exiting. In particular, the signals comprise an ignition signal.

A conventional steering device, which is not configured according to the steer-by-wire principle and without a mechanical fallback level, is known from the publication of patent application DE 10 2017 218 830 A1, in which a servo motor is placed in a specific retarding mode of operation for maintenance or theft protection when movement of the servo motor caused by an external force, for example by manually accelerated wheels, is sensed. The servo motor is arranged on a steering gear train operatively connected to wheels of the motor vehicle. For example, a voltage generated by a movement of a wheel, in particular electromotive force, is sensed.

SUMMARY

The method according to the disclosure is characterized in that an electrical voltage of the electric machine is sensed in the idle state in order to detect a rotational movement of the steering handle, and in particular that if the electrical voltage at least reaches, and in particular exceeds a predetermined threshold value, the active state is activated. This advantageously ensures that a rotational movement of the steering handle with minimum energy expenditure is detected by merely monitoring an electrical voltage as the operational magnitude of the electric machine. Compared to the above known methods, it is not intended to monitor and evaluate complex trigger conditions. The basic idea of the disclosure is to detect in an energy efficient manner when the steering handle is rotated by a driver when the motor vehicle is in an idle state, in particular parked, by measuring an electrical voltage and automatically activating the active state as a function thereof, in which the electric machine provides a counter torque, preferably identical to the active state during normal driving operations, or, alternatively, in order to compensate for the rotational movement at least in part, in particular to compensate for it completely, in order to hold the steering handle in a predetermined rotational position, for example the current rotational position at least when the vehicle is at a standstill, in particular as opposed to the active state during normal driving operation, in which the rotation can only be carried out against the corresponding torque. Preferably, a rotational angle of the steering handling is detected and/or a height adjustment of the steering handle is enabled and/or performed in the active state. In particular, it is provided that a period between reaching the threshold value and activating the active state is only a fraction of a second, particularly in the range of a few hundred milliseconds, for example in a range of 200 to 300 ms. As mentioned above, opening the vehicle door, for example, serves as a trigger for turning on the machine. However, if the driver remains seated in the parked vehicle, for example because he is waiting for something, but wants to exit the vehicle while holding on to the steering handle to be able to exit more easily, the machine would not set a counter torque because it is switched off. In this exemplary application, there is a certain risk of injury if the driver does not expect the steering wheel to have no or at least a lower rotational resistance. The method according to the disclosure ensures that once the corresponding voltage reaches the threshold value, the machine is controlled to set the counter torque. In particular, the threshold is set low enough so that it is reached before a process of exiting the vehicle is complete, but high enough that the machine is not activated by the smallest movement of the steering handle. Preferably, the threshold is variable, for example it is automatically set as a function of a driver characteristic (weight, age, physical strength, etc.). In particular, the steering handle can be rotated at least almost without resistance in the idle state.

According to a preferred further development of the disclosure, it is provided that the electric machine is configured in multiple phases and that at least one voltage induced in one of the phases of the electric machine is sensed as the electric voltage. This makes it easy to ensure that a rotational movement is detected, which is particularly advantageous. In this respect, an electrical voltage necessarily induced by the rotational movement is measured in the phases of the electric machine, for example, because a permanent magnet on a rotor of the machine induces an electrical voltage in a stator of the machine.

Particularly preferably, it is provided that a voltage drop is sensed through an electrical resistance of an integrated circuit of the electric machine (ASIC) as the electric voltage. This creates a particularly simple way to sense the voltage.

The measurement is carried out in particular in an already existing ASIC, so that no additional components or sensors are required.

According to a preferred further development of the disclosure, it is provided that a control device associated with the electric machine is woken up to activate the active state. This creates a particularly advantageously simple way to activate the active state. In this respect, the control device associated with the electric machine is woken up to provide a counter torque.

Particularly preferably, it is provided that the control device is woken up using an activation signal of an integrated circuit of the electric machine (ASIC). This results in the advantage that the control device itself only has to react to the activation signal and otherwise remains in a power-saving idle state. The control device is in particular configured as a control unit (ECU) and/or microcontroller.

According to a preferred further development of the disclosure, it is provided that the threshold value corresponds to a high level of the integrated circuit and that the activation signal is generated when the high level is at least reached, and in particular when it is exceeded. The activation signal is advantageously automatically generated in this respect without the need for a further method step. This ensures a particularly robust activation.

Particularly preferably, it is provided that an opening state of a driver door of the motor vehicle is monitored and that the active state is deactivated again if it is detected that the driver door has been first opened and then closed. This results in the advantage that the steering device returns to the power-saving idle state as soon as its support function is no longer needed by the driver, because the aforementioned exit operation is in particular completed.

The steering device of a motor vehicle according to the steer-by-wire principle having the features of disclosure in some embodiments comprises a rotatable steering handle, in particular a steering wheel, for specifying a steering request and an electric machine mechanically coupled to the steering handle. It is characterized by a control device and/or an integrated circuit, which is specifically designed to perform the method according to the disclosure. The advantages specified hereinabove are achieved as a result.

The motor vehicle having the features of disclosure in some embodiments comprises the steering device according to the disclosure. This also results in the advantages specified hereinabove.

BRIEF DESCRIPTION OF THE DRAWINGS

Further preferred features and combinations of features result from the previous description and from the disclosure. The disclosure is explained in more detail below with reference to the drawings. Shown are.

DETAILED DESCRIPTION

Figure 1:
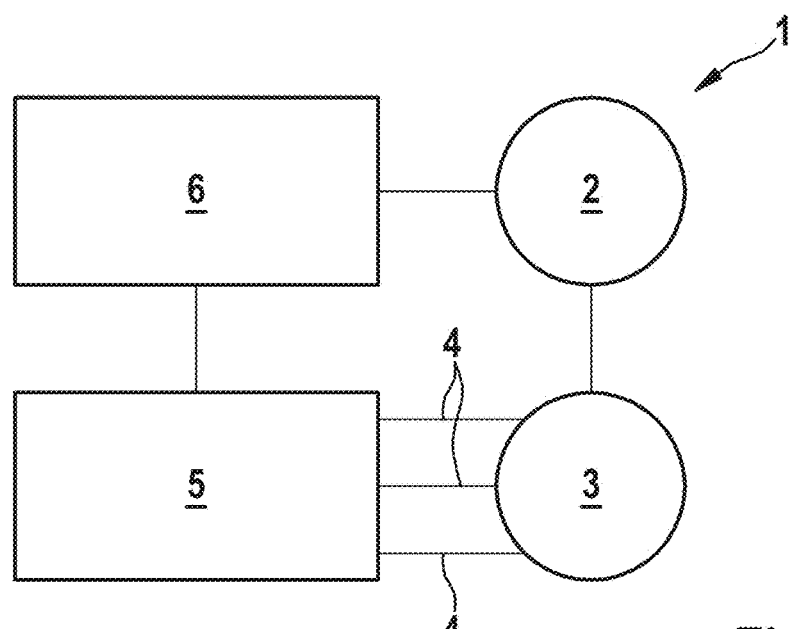
FIG. 1 a steering device of a motor vehicle.

FIG. 1 shows, only schematically, components of a steering device 1 of a motor vehicle which is otherwise not shown. The steering device 1 is configured according to the steer-by-wire principle and comprises a rotatable steering handle 2, which is in the present case shown as a steering wheel, for providing a steering request as well as an electric machine 3 mechanically coupled to the steering handle. The electric machine 3 is configured in multiple phases and in the present case comprises three electrical phases 4, with which it is electrically connected to an integrated circuit (ASIC) 5. Finally, a control device 6 is provided, which is respectively communicatively and/or electrically connected to the circuit 5 and thus to the electric machine 3 as well as to the steering handle 2.

The electric machine 3 is configured to be activated in an active state of the steering device 1 to generate a reset torque counteracting a rotational movement of the steering handle 2. In an idle state of the steering device, the machine 3 is not control free.

Figure 2:
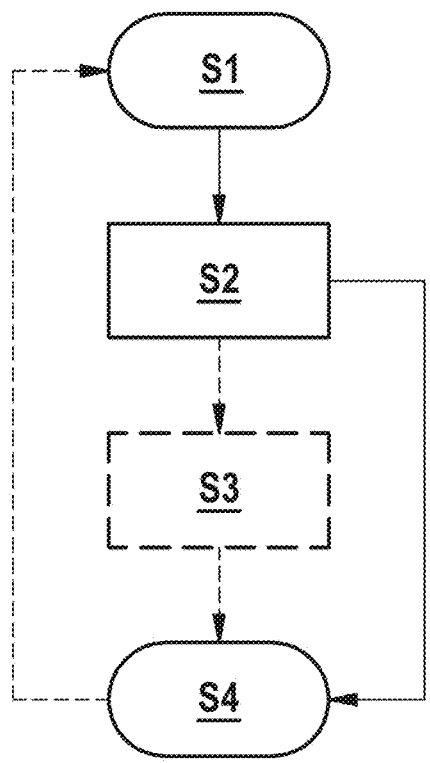
FIG. 2 an advantageous method for operating the steering device.

The following describes an advantageous method for operating the steering device 1, with reference to FIG. 2. For this purpose, FIG. 2 shows the method in the form of a flow chart. In particular, the method ensures that the electric machine 3 is safely placed in an active state once a rotational movement of the steering handle 2 has been detected.

In a step S1, the method begins with the steering device 1 being in the idle state. The electric machine 3 is control free in this respect, as described above. An electrical voltage of the electric machine 3 is now sensed to detect a rotational movement of the steering handle 2. In particular, at least one voltage induced in one of the phases 4 of the electric machine 3 is sensed as the electric voltage. More specifically, a voltage drop is preferably sensed through an electrical resistance of the integrated circuit 5.

If the electrical voltage at least reaches, in particular exceeds, a predetermined threshold value, the method is continued with a step S2. The threshold value corresponds in particular to a high level of the integrated circuit 5.

In the step S2, the active state is activated, so the electric machine 3 is actuated to generate a reset torque countering the rotational movement. For example, a driver may hold on to/support themselves on the steering handle 2 when exiting. For this purpose, the control device 6 is preferably woken up, in particular using an activation signal of the integrated circuit 5. In particular, the activation signal is generated when the high level is at least reached, in particular exceeded. The method is now ended with a step S4.

Alternatively, in an optional intermediate step S3, an opening state of a driver door of the motor vehicle is monitored. If the driver door is detected to have been first opened and then closed, it is assumed that the exiting operation is finished and the active state is deactivated again, i.e. the idle state is reactivated. The method ends with the step S4. In particular, the method returns to step S1 again.

What is claimed is:

1. A method for operating a steering device of a motor vehicle according to the steer-by-wire principle, the steering device including a rotatable steering wheel configured to provide a steering request, wherein the steering device comprises an electric machine mechanically coupled to the steering wheel, the electric machine in an active state of the steering device is actuated to generate a reset torque counteracting the rotational movement of the steering wheel, and the electric machine is control free in an idle state of the steering device, the method comprising:

sensing, in the idle state, an electrical voltage of the electric machine to detect a rotational movement of the steering wheel; and activating the active state in response to the electrical voltage exceeding a predetermined threshold value.

2. The method according to claim 1, wherein:

the electric machine is configured in multiple phases; and at least one voltage induced in one of the multiple phases of the electric machine is sensed as the electric voltage.

3. The method according to claim 1, wherein a voltage drop over an electrical resistance of an integrated circuit (ASIC) of the electric machine is detected as the electrical voltage.

4. The method according to claim 1, wherein, a control device associated with the electric machine is woken up to activate the active state.

5. The method according to claim 4, wherein, the control device is woken up using an activation signal of an integrated circuit (ASIC) of the electric machine.

6. The method according to claim 5, wherein:
the predetermined threshold value corresponds to a high level of the integrated circuit; and
the activation signal is generated when the high level is exceeded.

7. The method according to claim 1, wherein:
an opening state of a driver door of the motor vehicle is monitored; and
the activated active state is deactivated in response to detecting that the driver door has been first opened and then closed.

8. A steering device of a motor vehicle according to the steer-by-wire principle, comprising:
a rotatable steering wheel configured to provide a steering request, wherein the steering device comprises an electric machine mechanically coupled to the steering wheel, the electric machine in an active state of the steering device is actuated to generate a reset torque counteracting the rotational movement of the steering wheel, and the electric machine is control free in an idle state of the steering device; and
a control device and/or an integrated circuit specifically adapted to perform the method according to claim 1.

9. A motor vehicle, comprising:
the steering device according to claim 8.

* * * * *